Aug. 27, 1957  C. W. WARREN  2,804,549
SPECTROPHOTOMETER COMPENSATION CONTROL
Filed Sept. 22, 1953
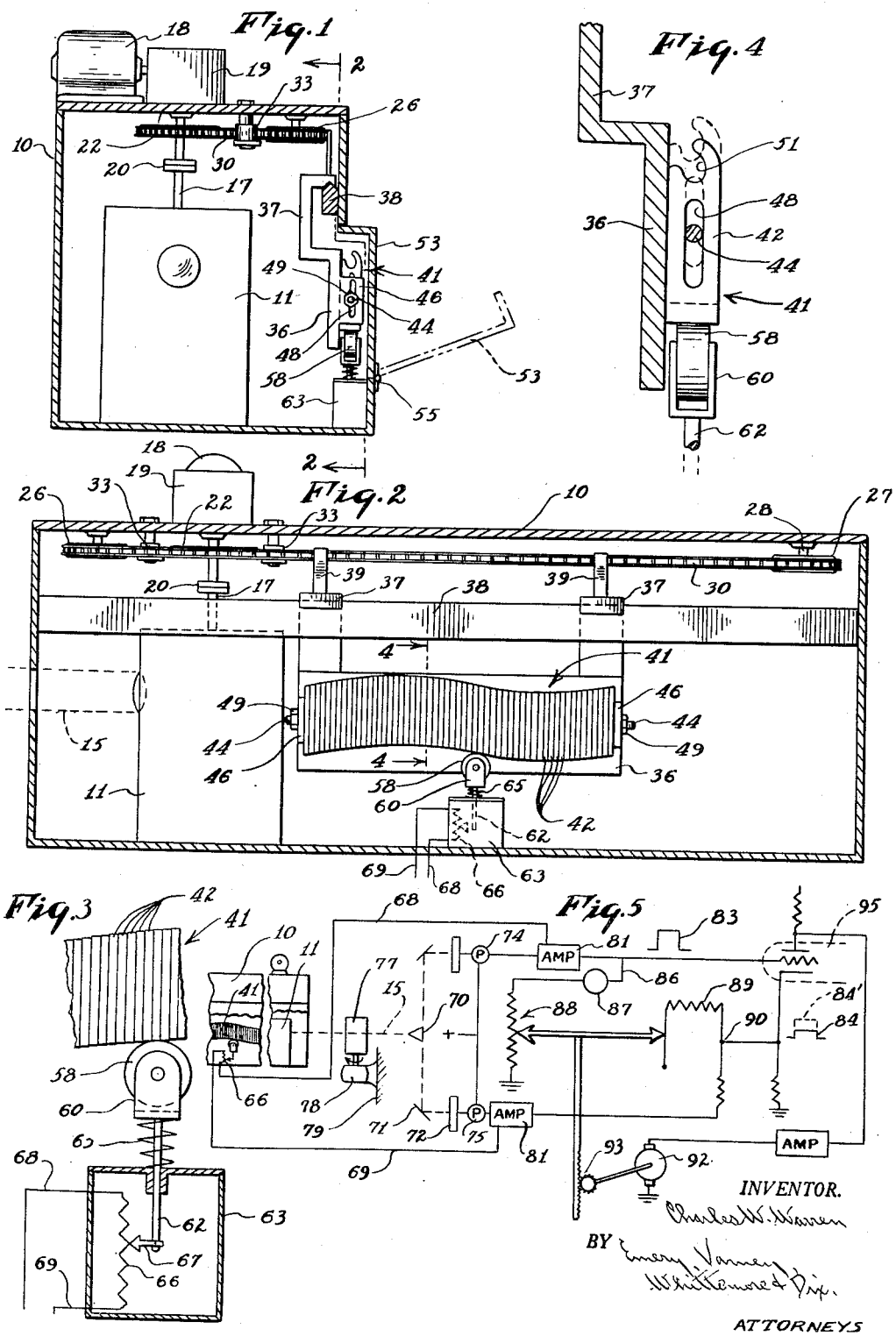
INVENTOR.
Charles W. Warren
BY Emery Varney
Whittemore & Dix
ATTORNEYS

United States Patent Office 2,804,549
Patented Aug. 27, 1957

2,804,549

SPECTROPHOTOMETER COMPENSATION CONTROL

Charles W. Warren, North Plainfield, N. J., assignor to The Perkin-Elmer Corporation, Norwalk, Conn., a corporation of New York Application September 22, 1953, Serial No. 381,712

9 Claims. (Cl. 250—209)

This invention relates to spectrophotometry and it is an object of the invention to provide improved apparatus for balancing comparator circuits of detectors which receive light or other radiant energy beams from a source which supplies radiant beams of pre-determined but variable wave length.

It is well known to determine the kind of material, or the proportions of material, in an unknown sample by finding its relative absorption characteristics for radiant energy of different wave lengths. This requires a supply of radiant energy of pre-determined wavelength, and also requires that the wave length be changed while the intensity of the radiant energy passing through the unknown sample is compared with a like beam passing through a reference cell or other known medium.

One difficulty with apparatus for making such comparisons is that the wave length sensitivity response of the detectors is not the same for all wave lengths, and coincident response curves are not obtained with the detectors commonly used for this kind of apparatus.

The differences in sensitivity response of the detectors supplying signals to the comparator circuits is compensated by using a balancing connection between the circuits, such as an impedance which is adjustable to bring the circuits into balance.

These impedances are commonly in the form of what is known as a "ladder network" having a plurality of potentiometers connected in parallel and provided with switches by which selected portions of the ladder network, or combinations of them, can be put into the balancing connection selectively in accordance with changes in the wave length of the radiant beam. These switches can be operated automatically, but the apparatus is complicated, expensive, and difficult to adjust.

It is an object of this invention to provide an improved balancing connection for comparator circuits used in spectrophotometry, and to provide automatic means for changing the adjustment of the balancing connection in a simple and reliable manner as the wave length of the radiant beam changes.

One feature of the invention relates to a cam that operates as a unit with the movable apparatus that changes the wave length of the radiant beam, and this cam is adjustable to displace a cam follower of an adjustable impedance or other means that changes the balancing connection between comparator circuits.

Other objects, features and advantages of the invention will appear or be pointed out as the description proceeds.

In the drawing, forming a part hereof, in which like reference characters indicate corresponding parts in all the views;

Figure 1 is a diagrammatic, transverse, sectional view through apparatus for supplying radiant energy of a pre-determined and varying wave length;

Figure 2 is a longitudinal, sectional view through the apparatus shown in Figure 1, the section being taken on the line 2—2 of Figure 1;

Figure 3 is an enlarged, fragmentary view, partly in section, showing the cam and cam follower of Figure 2 connected with an adjustable impedance which is used as a balancing connection between comparator circuits;

Figure 4 is a greatly enlarged sectional view taken on the line 4—4 of Figure 2; and Figure 5 is a wiring diagram showing the invention in combination with the comparator circuits of spectrophotometric apparatus.

Figure 1 shows a housing 10 containing a radiant energy generator 11 which is preferably a hood containing a light source and prism with suitable reflectors for supplying a beam 15 of radiant energy, preferably light which is of pre-determined wave length. The wave length of the beam 15 is changed by rotation of a shaft 17 connected with a motor 18 through reduction gearing 19 and a coupling 20.

There is a sprocket 22 on the output shaft of the reduction gearing 19, and this sprocket 22 rotates as a unit with the shaft 17 so that the angular position of the sprocket 22, at any time, depends upon the angular position of the shaft 17 and the resulting wave length of the radiant beam 15.

Referring to Figure 2, there are other chain sprockets 26 and 27 supported from the top of the housing 10 by axles 28. An endless chain 30 passes around the sprockets 26 and 27 and around the idler rollers 33 which lead one run of the chain rearwardly and around the sprocket 22.

The idler rollers 33 can be adjusted to control the tension of the chain 30. With the construction thus far described, it will be evident that the chain 30 moves whenever the sprocket 22 rotates, and that the longitudinal movement of the chain is proportioned to the angular movement of the sprocket 22 and consequently proportioned to any changes in the wave length of the beam 15.

A carriage 36 has brackets 37 which support it from a track 38 attached to a front wall of the housing 10. These brackets 37 are connected to the chain 30 by connections 39 so that the brackets 37 move along the track 38 in accordance with the movement of the chain 30.

On the front of the carriage 36 there is an adjustable cam 41. This cam is made up of a large number of laminations 42 which are clamped together by a bolt 44 extending through the entire length of the cam.

The end portions of the bolt 44 extend through brackets 46 which are rigidly attached to the carriage 36, and the laminations 42 are held against displacement by flat, rearward faces which contact with the front face of the carriage 36. The individual laminations 42 have slots 48, best shown in Figure 4, through which the bolt 44 extends. This construction prevents displacement of the laminations 42 away from the face of the carriage 36, but leaves them free to move up and down.

Nuts 49 at opposite ends of the bolt 44 are used to control the clamping pressure of the laminations 44 against one another so as to provide sufficient friction to hold the laminations in any set position while still permitting their movement to adjust the displacement of the cam. The brackets 46, while rigidly connected to the carriage 36, have sufficient resilience to change their pressure against the end laminations of the cam as one or the other of the nuts 49 are tightened. If desired, the laminations 44 can be clamped rigidly in set position, and the nuts 49 loosened slightly when another adjustment of the cam becomes neecssary because of replacement of one or the other of the detectors of the comparator circuits for which the cam 41 is to be used.

In order to facilitate the adjustment of the individual cam elements or laminations 42, each lamination is made with a hook 51 at its upper end for engagement by a tool which is used for making the initial adjustments of the laminations. The housing 10 has a front panel 53 connected to the housing by a hinge 55 which permits the front panel to be swung downwardly, as indicated in dotted lines in Figure 1, to open the housing and expose the cam. This permits adjustment of the cam without dismantling any parts of the apparatus.

A cam follower 58 is located in front of the lower portion of the carriage 36 and below the cam 41. This cam follower is carried by a yoke 60 at the upper end of a rod 62 which extends downwardly into a housing 63. A compression spring 65, between the top of the housing 63 and the bottom of the yoke 60, holds the cam follower 58 in contact with the bottom face of the cam 41.

Within the housing 63 there is a potentiometer 66 having a movable element 67 carried by the lower end of the rod 62. The potentiometer 66 has conductors 68 and 69 for connecting it with the comparator circuits which it is used to balance.

Figure 5 shows the way in which the potentiometer 66 is connected with the comparator circuits. The radiant beam 15 is supplied to a beam splitter 70 from which similar beams are directed to reflectors 71 and through cells 72 to radiant energy detectors 74 and 75.

The light beam 15 is repetitively interrupted by a chopper comprising a revolving shutter 77 mounted on an extension of the armature shaft a of a motor 78 attached to a fixed support 79.

The cell 72 in front of the detector 74 ordinarily contains air or some medium of which the radiant energy absorption qualities are known. The cell 72 in front of the detector 75 contains a sample of the unknown material, or an unknown mixture of materials for which the light absorption characteristics are to be determined.

There is an amplifier 81 connected with the output circuit of each of the detectors 74 and 75. The amplified signal from the detector 74 is represented by the wave designated by the reference character 83. The signal from the sample circuit is ordinarily weaker and is indicated by the full line wave designated by the reference character 84.

The comparator circuits of Figure 5 operate on the principle of building up the signal of the sample circuit to the same value as the signal 82 of the reference circuit, and measuring the amount of energy required for such a build up. An adding circuit 86 includs a meter 87, potentiometer 88 and impedance 89 leading to a junction 90 with the output circuit from the amplifier 81 which receives the reference signals from the detector 75.

When the potentiometer 88 is properly adjusted, the added signal from the reference signal circuit builds up the signal 84 to the value indicated in dotted lines and designated by the reference character 84'. This signal 84' is of equal strength with the signal 83, and the signal strength required to build it to this equal value is determined by the meter 87. The reading of this meter is, therefore, a measure of the energy absorption characteristic of the material in the sample cell 72 for the particular wave length of the radiant energy beam at the time that the reading of the meter 87 is made. This meter 87 is merely representative of apparatus for recording the intensity of the added signal, and it may produce a graph in accordance with the operation of the conventional types of electrical recording equipment.

The potentiometer 88 is adjusted automatically by a motor 92 through rack and pinion motion-transmitting connections 93. The operation of the motor is controlled by an electronic tube 95 which has its cathode connected to the junction 90 of the circuit and its grid connected to the output of the amplifier 81 of the reference signal circuit.

In order to balance the comparator circuits and compensate for differences in the wave length sensitivity response of the detectors 74 and 75, the conductors 68 and 69 are connected to the respective comparator circuits and the adjustment of the potentiometer 66 produces a balancing of the circuits of the detectors 74 and 75. This balancing is made before the sample material is placed in the cell 72 of the detector 75.

During the balancing operation, the shaft 17 (Figure 1) is moved into different angular positions, closely spaced from one another, and the comparator circuits are balanced for each position of the shaft 17, these positions corresponding to differences in wave length of the radiant beam.

The balancing is obtained by moving the laminations 42, which are immediately above thte cam follower 58, into the position which adjusts the potentiometer 66 to balance the comparator circuits.

If the detectors 74 and 75 are equal in their response for all wave lengths of the radiant beam, the bottom face of the cam 41 will be a straight line parallel with the track 39. Ordinarily, there are slight variations in wave length sensitivity response of one detector with respect to the other, but these variations are never abrupt, and the adjustments of the cam 41 produce a gradual and fair curve, as shown in Figure 2.

Once the cam 41 has been adjusted, it will be evident that the movement of the cam follower 58, and the subsequent adjustments of the potentiometer 66, compensate for the differences in wave length sensitivity response of the respective detectors 74 and 75 so that this variable need not be considered in determining the light absorption characteristics of tthe sample being tested.

The preferred embodiment of the innvention has been illustrated and described, but changes and modifications can be made without departing from the invention as defined in the claims.

I claim as my invention:

1. Spectrophotometry apparatus including two detectors for receiving radiant energy from beams of similar wave length, one of which passes through a sample cell and the other of which passes through a reference cell, comparator circuits to which signals are supplied by the respective detectors, a source of light of predetermined wave length including an adjustable device for changing the wave length of the radiant beams supplied to the detectors, a balancing circuit connecting the comparator circuits, the balancing circuit including an adjustable element which is movable to change an electrical characteristic of the balancing circuit to compensate for differences in wave length sensitivity response of the respective detectors, and motion transmitting connections between the adjustable device for changing the wave length and the adjustable element for moving said element to change the balancing circuit in accordance with changes in the wave length.

2. The combination described in claim 1 characterized by motion transmitting connections, between the adjustable device that changes the wave length and the adjustable element of the balancing circuit, which include a cam having different portions of the cam movable to change the throw of the cam at any region of the cam length in accordance with the amount of adjustment necessary for the wave length corresponding to the particular position of the cam.

3. Apparatus for measuring the comparative absorption characteristics of sample substances to radiant energy of different wave lengths, said apparatus including two detectors, one of which receives light through a sample medium and the other of which receives light through a known reference medium, comparator circuits connected with the respective detectors, a balancing circuit between the comparator circuits for balancing the comparator circuits to compensate for differences in the wave length sensitivity response of the respective detectors, the balancing circuit including an adjustable impedance, a source of radiant energy that supplies beams of equal wave length and substantially equal intensity to the detectors and that includes an adjustable device for changing the wave length of the radiant energy supplied to the detectors, a carriage movable along a course in proportion to the adjustment of the device for changing the wave length, a cam connected with the carriage and including a plurality of elements located side by side and movable with respect to one another to change the shape of the cam, and a cam follower connected to the adjustable impedance for changing the impedance in accordance with the position of the cam.

4. Apparatus for comparing the intensity of radiant energy beams, one of which passes through an unknown sample medium and the other of which passes through a known reference medium, the apparatus including two detectors to which the respective beams are supplied, comparator circuits to which the detectors supply signals, amplifiers in the comparator circuits, an adding circuit that supplies signal strength from the reference beam circuit to the sample beam circuit to build up the strength of the signal in the sample beam circuit when it is weaker than the signal in the reference beam circuit, and another connection between the comparator circuits including a balancing circuit with an adjustable element movable into different positions to compensate for differences in the wave length sensitivity response of the detectors, a device supplying radiant energy beams of equal wave length to the respective detectors, said device being movable into different adjusted positions to change the wave length of the radiant energy beams supplied to the detectors, and an adjustable cam connected to said device and movable as a unit with said device as the latter is adjusted to change the wave length, the adjustable element of the balancing circuit having a cam follower connected thereto and located in a position to be operated by said cam.

5. The apparatus described in claim 4 characterized by a balancing connection which includes an adjustable impedance, a carriage movable along a course in accordance with changes in the wave length of the radiant beam, and adjustable elements at spaced locations along the carriage to shift the position of the adjustable impedance in accordance with changes in the wave length of the beams.

6. Apparatus for balancing the comparator circuits for differences in wave length sensitivity response of radiant energy detectors that supply signals to the comparator circuits, said apparatus including a balancing circuit that is placed between the circuits and which has an adjustable impedance therein, a carriage for connection with an adjustable source of radiant energy, the carriage being movable along a course in proportion to the adjustment of the source of radiant energy to change the wave length, and adjustable elements spaced along the carriage in position to change the adjustment of the impedance in the balancing circuit.

7. The apparatus described in claim 6 characterized by a cam follower connected to the adjustable impedance, and by a cam having different portions which serve as the adjustable elements spaced along the carriage and that move with the carriage.

8. The apparatus described in claim 6 characterized by a plurality of independently movable laminations placed side by side along the length of the carriage and clamped together to provide friction for holding them in any adjusted position, said laminations providing a cam surface for displacing a cam follower which is connected with the adjustable impedance.

9. Apparatus that supplies a radiant energy beam of a pre-determined but variable wave length, and that includes means movable in proportion to the change in wave length of the beam, an adjustable cam connected to the movable means for movement as a unit therewith, comparator circuits that are supplied with radiant energy from the apparatus, a light-sensitive detector in each of the comparator circuits, an amplifier for the signals from each detector, a detector-sensitivity balancing circuit connected to at least one of the amplifiers for compensating differences in sensitivity of the detectors to radiant energy of different wave lengths, said balancing circuit having an element which is adjustable to change an electrical characteristic of the balancing circuit to balance the wave length sensitivity response of the detectors in the respective comparator circuits, and motion-transmitting connections between the adjustable element and a cam follower which is displaced by the cam.

References Cited in the file of this patent
UNITED STATES PATENTS

| | | |
|---|---|---|
| 2,332,333 | Morgan | Oct. 19, 1943 |
| 2,336,550 | Kruper | Dec. 14, 1943 |
| 2,621,298 | Wilde et al. | Dec. 9, 1952 |